US008680992B2

(12) United States Patent
Kruglick

(10) Patent No.: US 8,680,992 B2
(45) Date of Patent: Mar. 25, 2014

(54) MEASURING AND IMPROVING THE QUALITY OF A USER EXPERIENCE

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 153 days.

(21) Appl. No.: 13/260,120

(22) PCT Filed: Sep. 3, 2010

(86) PCT No.: PCT/US2010/047805
§ 371 (c)(1),
(2), (4) Date: Sep. 23, 2011

(87) PCT Pub. No.: WO2010/135840
PCT Pub. Date: Dec. 2, 2010

(65) Prior Publication Data
US 2012/0068845 A1 Mar. 22, 2012

(51) Int. Cl.
*G08B 21/00* (2006.01)
(52) U.S. Cl.
USPC .......................................... 340/540
(58) Field of Classification Search
USPC .......... 340/540, 539.13, 573.1; 704/260, 270, 704/270.1
See application file for complete search history.

(56) References Cited

U.S. PATENT DOCUMENTS

| 6,353,810 | B1 | 3/2002 | Petrushin |
| 2006/0279530 | A1 | 12/2006 | Jung et al. |
| 2008/0147407 | A1 | 6/2008 | Da Palma et al. |
| 2008/0153554 | A1 | 6/2008 | Yoon et al. |
| 2008/0171573 | A1 | 7/2008 | Eom et al. |
| 2010/0130257 | A1 | 5/2010 | Jang |

FOREIGN PATENT DOCUMENTS

| CA | 2694742 A1 | 8/2010 |
| WO | 2009097337 A1 | 8/2009 |

OTHER PUBLICATIONS

Ricknås, Mikael, Gestures set to shake up mobile user interfaces, InfoWorld News, Sep. 8, 2009, accessed online via http://www.infoworld.com/d/mobilize/gestures-set-shake-mobile-user-interfaces-695.
Cherry, Steven, Anger Management, IEEE Spectrum, Apr. 2005, accessed online via http://spectrum.ieee.org/at-work/tech-careers/anger-management.
United States Patent and Trademark Office, International Search Report and Written Opinion of the International Searching Authority for PCT/US10/47805, prepared on Jan. 3, 2011, USA.
Ravenscraft, E., "The Best Changes to the New Google Maps for Android," Google Maps, Updated on Jul. 10, 2013, accessed at http://lifehacker.com/the-best-changes-to-the-new-google-maps-for-android-731434697, accessed on Oct. 10, 2013, pp. 1-9.
"Inference, Dynamics and Interaction Group," University of Glasgow, accessed at http://www.dcs.gla.ac.uk/~rod/dynamics.html, accessed on Oct. 10, 2013, pp. 1-6.

*Primary Examiner* — Jeffery Hofsass
(74) *Attorney, Agent, or Firm* — Brundidge & Stanger, P.C.

(57) ABSTRACT

Implementations and techniques for measuring and improving the quality of a user experience are generally disclosed.

29 Claims, 7 Drawing Sheets

600 A computer program product

602 A signal bearing medium 604 at least one of detecting a user frustration event;

associating the user frustration event with a device event;

forming an event package based at least in part on the user frustration event and the device event;

transmitting the event package;

receiving an event package including a user frustration event indicator and an associated event indicator;

determining feedback based at least in part on the user frustration event indicator and the associated event indicator;

providing the feedback;

providing a first service to a first user group;

receiving a first set of frustration event packages related to the first service;

providing a second service;

receiving a second set of frustration event packages related to the second service; or evaluating the first set of frustration event packages and the second set of frustration event packages to determine whether the first service or the second service provides a better user experience.

| 606 a computer-readable medium | 608 a recordable medium | 610 a communications medium |

Fig. 6

MEASURING AND IMPROVING THE QUALITY OF A USER EXPERIENCE

BACKGROUND

Unless otherwise indicated herein, the approaches described in this section are not prior art to the claims in this application and are not admitted to be prior art by inclusion in this section.

Increased adoption of new mobile devices and services may depend on the quality of experience perceived by users. Current methods for evaluating user experience may be network based and may be delayed from the user's experience.

SUMMARY

In accordance with some implementations, methods for providing feedback from a device may include detecting a user frustration event, associating the user frustration event with a device event, forming an event package based on the user frustration event and the device event and transmitting the event package.

In accordance with some implementations, methods for using feedback at a system may include receiving a frustration event package including a user frustration event indicator and an associated event indicator, determining feedback based on the user frustration event indicator and the associated event indicator and providing the feedback.

In accordance with some implementations, methods for evaluating services may include providing a service to a user group, receiving a set of frustration event packages related to that service, providing another service, receiving another set of frustration event packages related to the other service and evaluating the frustration event packages to determine which service provides a better user experience.

In accordance with some implementations, devices for providing user feedback may include a frustration detection module configured to detect a user frustration event and provide a user frustration signal, a device event determination module configured to determine a device event associated with the user frustration signal and a frustration package formation module configured to generate a frustration event package including a user frustration event indicator and a device event indicator.

In accordance with some implementations, an article may include a computer program product having stored therein instructions that, if executed, format data to detect a user frustration event, associate the user frustration event with a device event, form an event package based at least in part on the user frustration event and the device event and transmit the event package.

In accordance with some implementations, an article may include a computer program product having stored therein instructions that, if executed, format data to receive an event package including a user frustration event indicator and an associated event indicator, determine feedback based at least in part on the user frustration event indicator and the associated event indicator and provide the feedback.

In accordance with some implementations, an article may include a computer program product having stored therein instructions that, if executed, format data to provide a service to a user group, receive a set of frustration event packages related to the service, provide another service, receive a set of frustration event packages related to that service and evaluate the frustration event packages to determine which service provides a better user experience.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 6 is an illustration of an example computer program product; and

DETAILED DESCRIPTION

Figure 1:
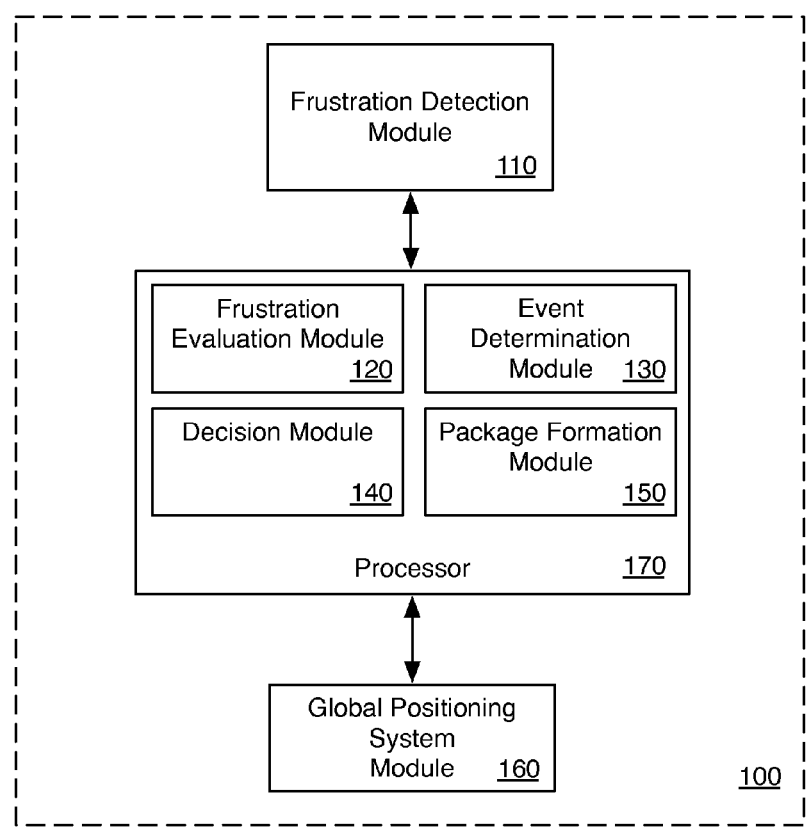
FIG. 1 is an illustration of an example device for providing user feedback.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatuses, systems and computer readable media related to measuring and improving the quality of a user experience.

It may be desirable to evaluate a user's quality of experience when the user is operating a mobile device. In general, a user may experience times of frustration using the device. The user frustration may cause, for example, non-productive actions by the user, such as, shaking the device or pressing buttons or a touch screen harder or longer than may be necessary for actuation. The non-productive actions may not increase the performance of the device but may be used to determine a cause of and transmit a package indicating the cause of user frustration.

It may also be desirable to receive the user frustration information such that a response may be taken that may alleviate the user's frustration or a user group's frustration. The response may be immediate, for example, if the user or multiple users may be frustrated by slower than normal download times or increases in the time to first usability of the webpage, a network may automatically provide increased network resources to those frustrated users. In other examples, the response may be delayed. For example, if the user frustration may be associated with a software application opening slowly or failing to respond to the user, feedback may be provided to software developers and the software may be upgraded or debugged based on feedback. In other examples, user frustration may be used to evaluate software or web pages. For example, different web page designs that may render the same resultant web page to users may each be deployed and user frustration may be used to determine which design may provide the better user experience with less frustration.

In some examples, the user frustration may be transmitted from a device. The user may provide frustration input such as shaking the device or angrily long pressing a button, for example. The frustration input may be evaluated against predetermined thresholds to determine that it may be a likely frustration event as opposed to regular operation of the device. Upon detection of an event of frustration, the device may associate that frustration with a device event, such as a web page download, use of a software application or the like. A frustration indicator that may include the type and degree of action that caused the frustration and an indicator of the associated device event may be included in an event package. The event package may be transmitted over a network for use as discussed above. In some examples, the event package may include other information, such as a geographic position of the user.

FIG. 1 is an illustration of an example device 100 that may be configured to provide user feedback. Device 100 may include a frustration detection module 110 and a processor 170 that may implement or include a frustration evaluation module 120, an event determination module 130, a decision module 140 and a package formation module 150. Device 100 may also include a global positioning system module 160. Frustration detection module 110 may include any device that may detect frustration. In an example, the device may include an accelerometer that may detect shaking, throwing or impact of the device. In another example, the device may include a haptic device that may detect a hard push or a long push of a button, such as a haptic screen, a touch screen or a button. Other example devices for detecting frustration may include a microphone (that may detect shouting or sighing for example) or a camera (that may detect a look of frustration or shaking, throwing or impact of the device). Frustration detection module 110 may be configured to detect a user frustration event and may include a controller or logic that may generate a signal, such as a user frustration signal, that may be transmitted to processor 130. The signal may be provided continuously or the signal may be provided when the signal may be above a threshold level.

Processor 170 may receive the signal for further processing. In an example, processor 170 may include or implement frustration evaluation module 120. Frustration evaluation module 120 may evaluate the signal to determine whether the signal indicates a frustration event (as opposed to normal device operation, for example). Frustration evaluation module 120 may determine whether a frustration event may have occurred by comparing the values or parameters indicated by the signal to a predetermined threshold, such as an event reporting threshold. For example, a signal indicating device acceleration may be compared to threshold values or patterns to determine whether the phone may have been shaken or thrown in frustration. In another example, a signal indicating a force applied to a haptic device may be compared to threshold values or patterns to determine whether the button was pushed hard or for a long duration in user frustration. In other examples, the signal may include a voice volume that may be compared to a threshold.

In some examples, frustration evaluation module 120 may receive a signal indicating a pattern such that pattern recognition may be used to detect the frustration. For example, the input signal may have an input parameter or parameters that may be compared with a predetermined pattern or patterns to determine whether the input parameters indicate frustration. Such pattern recognition examples may be employed for voice recognition using a microphone as an input device or for pattern or facial recognition using a camera as an input device.

If frustration evaluation module 120 determines a frustration event occurred, event determination module 130 may be invoked to determine a device event related to the frustration event. For example, a device event determination module may be configured to evaluate the device to determine the active operations of the device that may have been operating when the user frustration occurred, and to determine one or more device events associated with the user frustration signal. In various examples, the frustration may have occurred during a web page download, running a software application, or opening a software application or the like. If no active device operations were occurring during the apparent frustration event, the frustration event may be ignored as a false frustration event, for example. In some examples, more than one active event may be occurring during the user frustration. In such examples, more than one device action may be associated with the frustration event. In other examples, a most likely event to cause frustration may be associated with the user frustration event. In some examples, frustration evaluation module 120 may not be included or its functions may be performed by frustration detection module 110. In such examples, the frustration signal may invoke event determination module 130 directly.

If event determination module 130 determines a device event to associate with the frustration event, decision module 140 may be invoked. Decision module 140 may determine whether the frustration event and the associated device event may be reported and when they may be reported. The reporting decision may be based in part on a rule set, for example. In some examples, the frustration and device events may not be of interest and they may be discarded. In other examples, event decision module 140 may determine the frustration and device events may be immediately reportable. In other examples, the events may be reportable, but not immediately. If it is determined the events may be reportable, package formation module 150 may be invoked.

Package formation module 150 may format a frustration event package including an indicator or indicators of the user frustration event and an indicator or indicators of the device event associated with the user frustration event. The frustration indicator may include, for example, the type of frustration, the level of the frustration, or the like. The device event indicator may include the type of the event, whether the event completed successfully, a rate of execution related to the event, or the like. The package may be formatted for transmission and may include, for example, header information or the like for successful transmission in a packet network. The package may be immediately uploaded to a network, for example. In other examples, the package may be saved to local memory for later uploading or retrieval using another device. In some examples, packages saved to memory may be discarded if the memory usage may negatively impact operation of the device.

In some examples, a global positioning system module 160 may be provided. Global positioning system module 160 may provide a position embodied in a position signal to processor 170. In some examples, global positioning system module 160 may continuously provide the positioning signal to processor 170. In other examples, global positioning system module 160 may provide a positioning signal in response to a position request. In an example, the position may be provided in response to a request provided when a frustration event has been detected. The position may be used by package formation module 150 for inclusion in the event package, for example.

As discussed, in some examples, frustration may be detected based at least in part on a user frustration event, such as shaking a device or shouting at the device. In other examples, the frustration detected may be based on the user indicating their frustration through a keystroke. In some examples, the keystroke may be a complaint button (either a discrete button provided for complaints or a complaint button implemented on a haptic screen). In other examples, the user may log their frustration using a dedicated user frustration keystroke, such as, for example, depressing two or more keys simultaneous. For example, the keystroke for complaints may be depressing the star key and the pound key simultaneously.

Device 100 may be employed to provide feedback based on user frustration in a variety of implementations as is discussed further herein. Device 100 may also be utilized in a variety of ways by a server, for example, to monitor the device, software running on the device, web pages downloaded to the device, or the like. In other examples, device 100 and feedback from device 100 may be used to evaluate or test software or web pages by providing different implementations to various devices and comparing frustration levels of the different implementations. Various methods may be used relative to apparatus 100 as is discussed herein.

In various examples, the illustrated modules of FIG. 1 may be implemented individually or collectively by a wide range of hardware, software or firmware, or combinations thereof. The modules may be implemented with application specific integrated circuits, field programmable gate arrays, digital signal processors or other integrated formats. In other examples, the modules may be implemented in computer programs or as firmware. In some examples, the modules of FIG. 1 may be implemented as part of system discussed with respect to FIG. 7, and as discussed herein.

Figure 2:
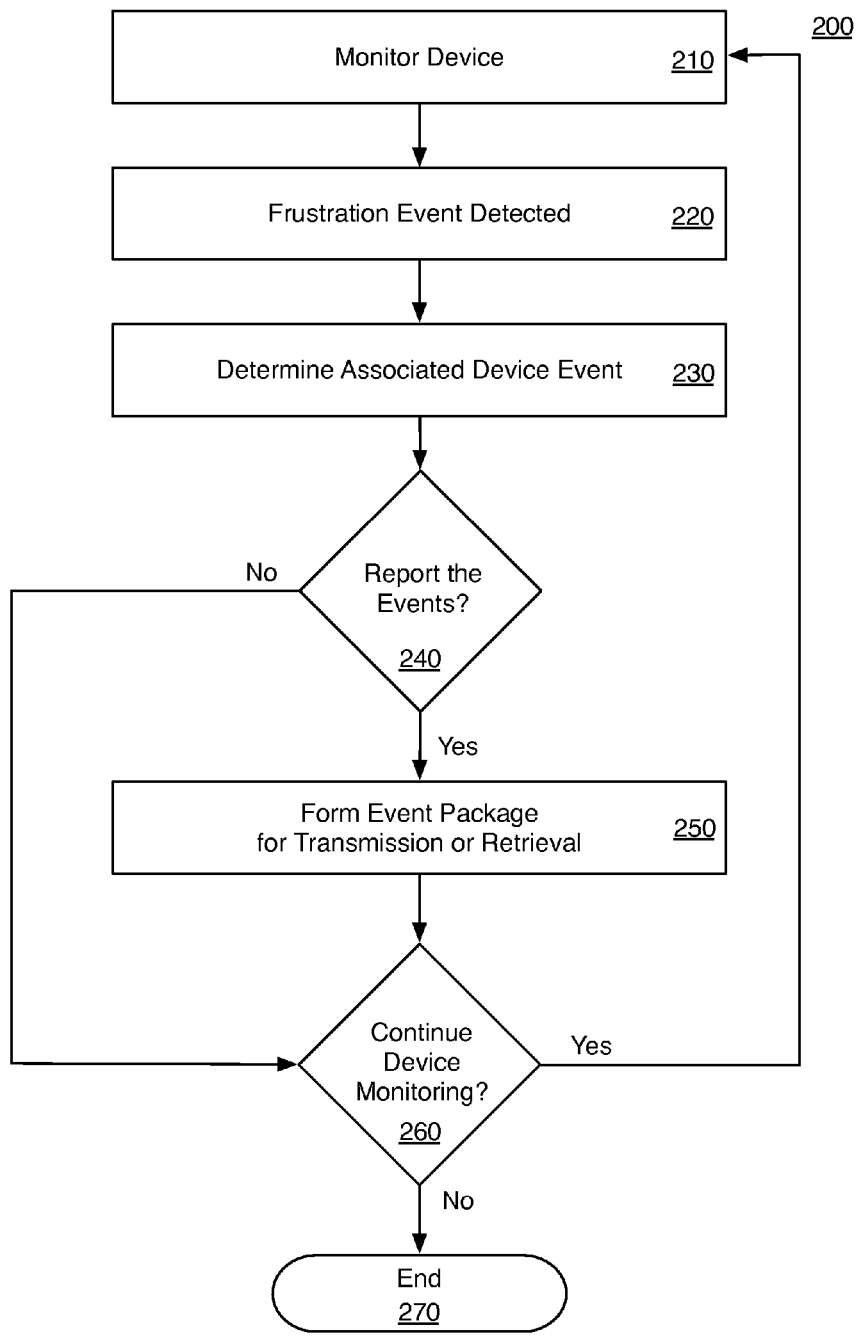
FIG. 2 is an illustration of a flow chart of an example method for providing user feedback.

FIG. 2 is an illustration of a flow chart of an example method 200 for providing user feedback from a device. In an example, method 200 of FIG. 2 may be implemented by device 100. Method 200 may include one or more functional operations or actions as illustrated by blocks 210 to 270. In some examples, method 200 may be implemented using a computing device as is discussed further herein.

At block 210, a device may be monitored for a frustration event. For example, the device monitoring may be performed by a frustration detection module and/or a frustration evaluation module. The frustration detection module may continuously monitor the device when the device is operational or it may intermittently monitor the device, for example when the device is being operated by a user. The device monitoring may be initialized by the user pressing any button on the device or a touch screen of the device, for example. At block 220, a frustration event may be detected. The frustration event may be a shaking of the device or a hard press of a key or touch screen of the device or any other event discussed herein. A frustration event may be detected when an input parameter related to the frustration event meets or is greater than a threshold or thresholds for the pertinent type of user action such that standard operations or movements of the device may not meet the threshold and may not trigger the detection of a frustration event. In various examples, the input parameter may include a button press force, a button press length, a device acceleration, a device velocity or a microphone volume. The button press force or button press length may relate to a physical button or a touch screen instantiation of a button.

In some examples, an event that may be perceived as frustration, such as shaking the device, may be discarded as not a frustration event because the shaking may be an input to an active application. For example, games may have device shaking as an input and some devices may feature shaking as a method for accepting or denying calls. Such events may be discarded as not related to user frustration. In other examples, the detected user frustration may be detected based on the user activating a complaint key or a frustration button, or depressing a unique frustration keystroke for indicating frustration as discussed herein. For events detected and classified as related to a user frustration event, method 200 may continue at block 230.

At block 230, a device event associated with the frustration event may be detected or determined. The associated event may be a web page download, a phone call, loading a software application, running a software application, a software operation or the like. In an example, the associated device event may be determined using an event determination module. In some examples, if no associated event is detected, the frustration event may be discarded. In other examples, even if no associated event is detected, the frustration event may still be reported. Method 200 may continue at block 240.

At block 240, it may be determined whether the frustration event and the associated device are to be reported. The determination may be made by a decision module, for example. Any methods or techniques discussed herein may be used to determine whether the events are reportable. In some examples, the events may not be of interest and no reporting may be required. If the events is determined not to be reportable, method 200 may continue at block 260. For reportable events, method 200 may continue at block 250. At block 250, an event package may be formed. The event package may include information regarding the user frustration event and the associated device event, such as indicators or data or the like. In an example, the user frustration event may be associated with a device position and the event package may include an indicator of the position of the device such as global positioning system information. In some examples, the package may also include information for routing the package through a packet network. In some examples, the package may be immediately transmitted to another device. In other examples, the package may be stored at the device such that the package may be transmitted at a later time or the package may be retrieved from the device at a later time. Method 200 may continue at block 260. At block 260, it may be determined whether the device monitoring may be continued. For continued monitoring, method 200 may continue at block 210. If monitoring is complete, the method may end at block 270.

Figure 3:
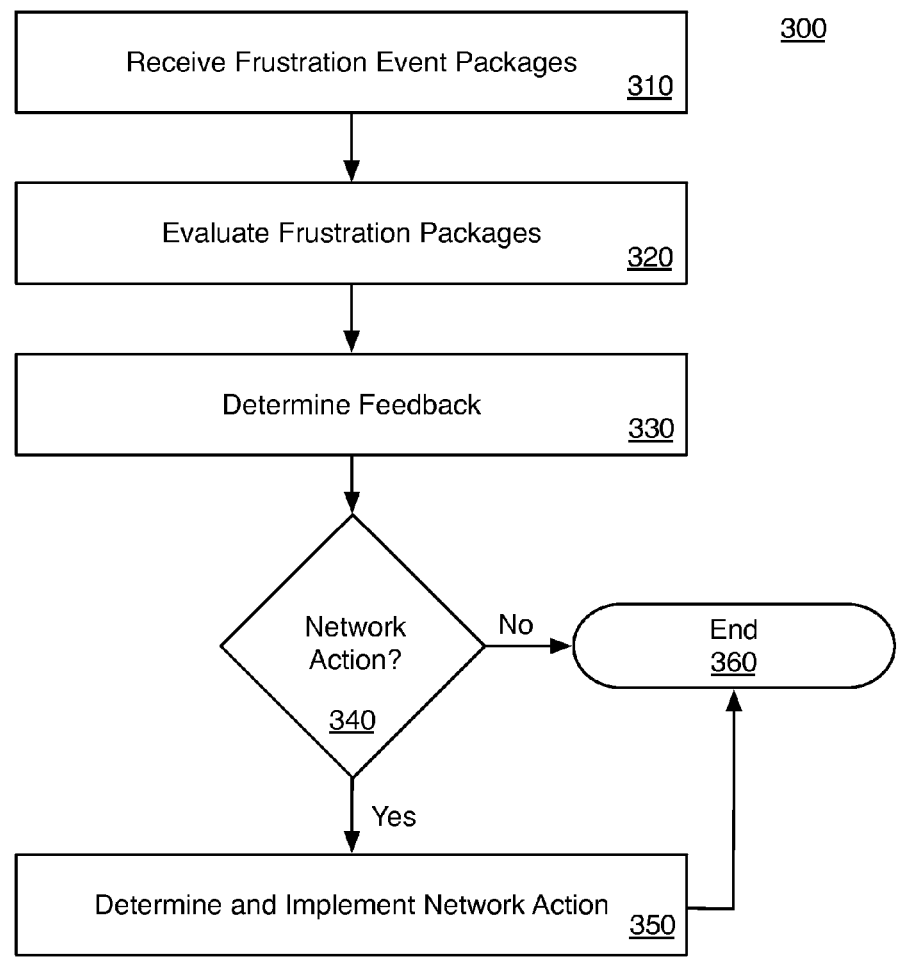
FIG. 3 is an illustration of a flow chart of an example method for using feedback to improve network performance.

As discussed, the feedback capabilities incorporated in devices may be utilized by device, service and software providers to improve performance and user experience. FIG. 3 is an illustration of a flow chart of a method 300 for using user feedback to improve network performance. Method 300 may include one or more functional operations or actions as illustrated by blocks 310 to 360. In some examples, method 300 may be implemented under the control of a computer system, as is further described herein.

At block 310, a system may receive frustration event packages. The packages may be received from any number of users over any period of time. The packages may generally indicate user frustration and may include an indicator or indicators of a user frustration event and an indicator or indicators of a device event associated with the user's frustration. In some examples, the package may also include an indicator or indicators of the device's position. In an example, the packages may be received over a wireless network from a number of wireless devices. At block 320, the frustration event packages may be evaluated. For example, the device event indicator or indicators in the packages may be evaluated, sorted or correlated such that it may be determined what device events and or what positions may be causing frustration for users.

At block 330, a cause or causes of frustration may be determined based at least in part on the received frustration packages, and feedback may be determined based at least in part on the cause or causes of frustration. In various examples, the feedback may be product feedback, device feedback or network feedback. In some examples, the feedback may be feedback for developers such as device developers or network developers. In general, the feedback may reflect the causes of frustration as a data file, text file, summary, or the like. In an example, it may be determined from the device event indicators that a cause of the users' frustration may be common among many users. For example, a high network traffic or a network failure may be detected from the receipt of packages having a high number of frustration events based on slow download times or download failures. Such high traffic occurrences may be caused by users aggregating at and commenting on events, such as film festivals or the like. In such examples, it may be determined from the packages that there may a cluster of frustration among users. The cluster may be based in a certain geography or network cell or the like. In examples where the frustration packages may include positioning information, the positioning information may be used to determine a location of the frustration. In other examples, information from the routing of the package or information based on the cell that received the package may be used to determine the location of a frustration cluster. In such examples, the feedback may include the location of the frustration. In some examples, events causing the frustration may be caused by a particular application having an unexpected problem or issue in an unexpected or unusual situation. Such unexpected problems may be difficult or impossible to detect in normal testing. For example, various combinations of network conditions and local memory conditions may not be tested through normal testing procedures.

Based on the detected cause of user frustration and the provided feedback, it may be determined at block 340 whether a network action may be taken. In some examples, the level of user frustration or the intensity of the frustration cluster may not warrant network action, or it may not be possible or cost effective to take an action. In such examples, method 300 may end at block 360. In other examples, a network action may be warranted based at least in part on the level of user frustration, the intensity of the frustration cluster, the ability of the network to alleviate the frustration or other network performance parameters in the location of frustration. In such examples, method 300 may continue at block 350. At block 350, a network action may be determined and taken. In various examples, the network action may include increasing a network service in a local area related to a device associated with the event frustration packages, increasing a power modulation in an area related to sender or senders of the packages or beam steering toward the area. In some examples, the network action may be taken to preemptively avoid further network problems such as avoiding a wide connection failure in the area. After the network action, method 300 may continue to an end at block 360. In some examples, the frustration area or cluster may monitored either by closely monitoring frustration packages or other techniques such as network bit-error, delay or re-requests to verify the network action may have alleviated the user's frustration.

Figure 4:
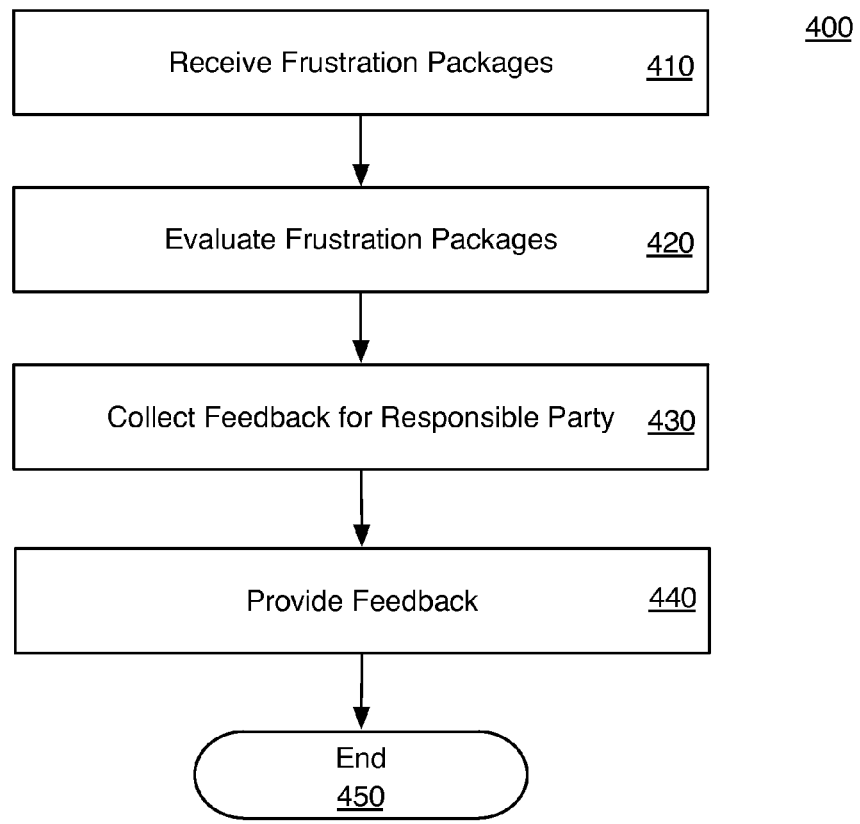
FIG. 4 is an illustration of a flow chart of an example method for providing feedback to responsible parties.

As discussed, the feedback capabilities incorporated in devices may be utilized by device, service and software providers to improve performance and user experience. FIG. 4 is an illustration of a flow chart of an example method for providing user feedback to responsible parties. Method 400 may include one or more functional operations or actions as illustrated by blocks 410 to 450. In some examples, method 400 may be implemented under the control of a computer system, as is further described herein.

At block 410, a system may receive frustration event packages from any number of users over any period of time. The packages may generally indicate user frustration and may include an indicator of a user frustration event and an indicator of a device event associated with the user's frustration as discussed herein. In an example, the packages may be received over a wireless network from a number of wireless devices. At block 420, the frustration packages may be evaluated. For example, the device event indicator in the packages may be evaluated, sorted or correlated such that it may be determined what device event or events may be causing frustration for users. Method 400 may continue at block 430.

At block 430, feedback may be determined based at least in part on the frustration packages. For example, the packages related to a certain device event, such as a software application, may be collected, organized or summarized. The collection of received frustration packages may be organized into a database or data file for example. In some examples, the feedback may be collected for a responsible party or parties. For example, a software developer or software service support team may be responsible for a software application or applet. The frustration feedback related to that software may be collected for the software developer or support team. Method 400 may continue at block 440.

At block 440, the collected feedback may be provided to the responsible party. The provided feedback may be a summary, a data file, a data collection or the raw unprocessed data received as frustration packages. In an example, the feedback may include a software application performance parameter or parameters. In another example, the feedback may include a download performance parameter or parameters. The feedback may be provided based at least in part on rule sets. For example, an applicable rule set may provide that feedback may be transmitted if the network is not congested. In some examples, the applicable rule set may provide that feedback may be transmitted to the responsible party immediately. In other examples, the applicable rule set may provide that feedback is to be stored and transmitted or distributed periodically, such as monthly or quarterly or the like. Method 400 may end at block 450.

Figure 5:
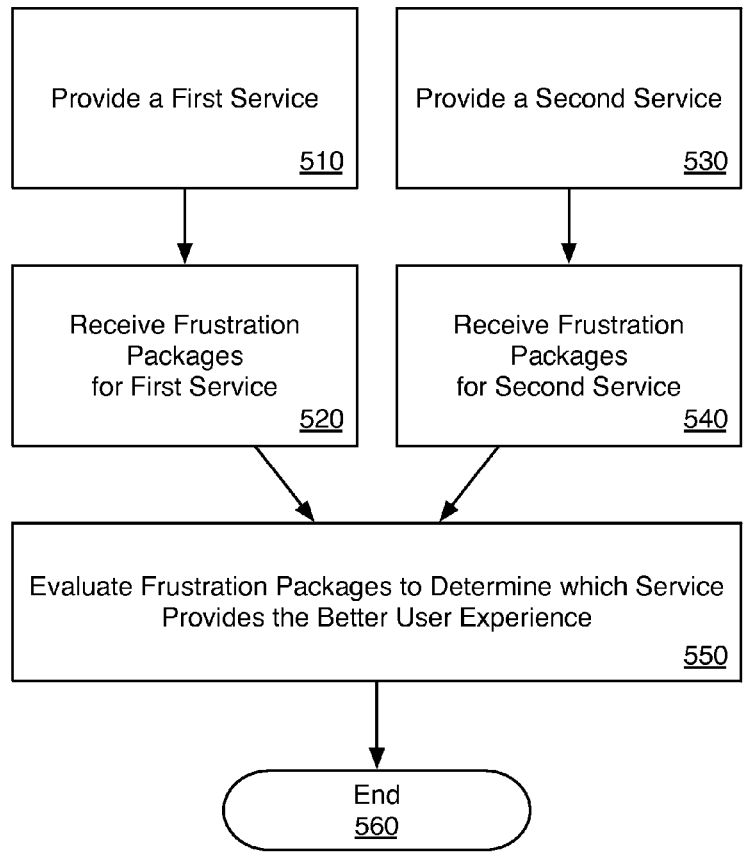
FIG. 5 is an illustration of a flow chart of an example method for using feedback to evaluate provided services.

As discussed, the feedback capabilities incorporated in devices may be utilized by device, service and software providers to improve performance and user experience. FIG. 5 is an illustration of a flow chart of an example method for using user feedback to evaluate provided services. Method 500 may include one or more functional operations or actions as illustrated by blocks 510 to 560. In some examples, method 500 may be implemented under the control of a computer system, as is further described herein.

At block 510 a first service may be provided to user group. The first service may include, for example, a software application or a web page or the like. At block 520, frustration packages or a first set of frustration packages such as those discussed herein and associated with the first provided service may be received. At block 530, a second service may be provided such as a software application or a web page, for example. The second service may be provided to the same user group (at different times for example) or it may be provided to another user group. At block 540, frustration packages or a second set of frustration packages associated with the second provided service may be received. The received packages may be evaluated, at block 550, to determine which service may provide the better user experience. In an example, the first and second sets of frustration packages may be evaluated. For example, the better user experience may be determined based at least in part on fewer or less intense user frustration events being received for the associated service. Upon determination of the better user experience, method 500 may end at block 560. In some examples, the evaluation results may be collected, summarized or correlated and provided to a third party, for example.

In some examples, the first and second services may provide similar or the same services to users. For example, the services may be different software packages that accomplish similar tasks or different web page designs that render substantially the same resultant web page to end users. The services may be provided over different periods of times to the same users or they may be provided contemporaneously to different subsets or groups of users. The services may thereby be efficiently compared for the better user experience with lower levels of frustration. Although two service may be shown by way of illustrative example, any number of services may be provided.

In other examples, the services may provide different services or consumer results such that market research may be gathered based on user frustration. In some examples, the received frustration packages may be compared to other software implementations or to baseline expectations, for example. Such research may be completed before full deployment of the service or release from beta testing. In an example, a single service may be provided or tested for marketing and quality purposes.

FIG. 6 illustrates an example computer program product 600 that is arranged in accordance with at least some embodiments of the present disclosure. Computer program product 600 may include a signal bearing medium 602. Signal bearing medium 602 may include one or more machine-readable instructions 604, which, when executed by one or more processors, may operatively enable a computing device to provide the functionality described herein with respect to FIGS. 1 to 5. In various examples, some or all of the machine-readable instructions may be used by the devices discussed with respect to FIG. 1 and/or FIG. 7.

In some implementations, signal bearing medium 602 may encompass a computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.).

Figure 7:
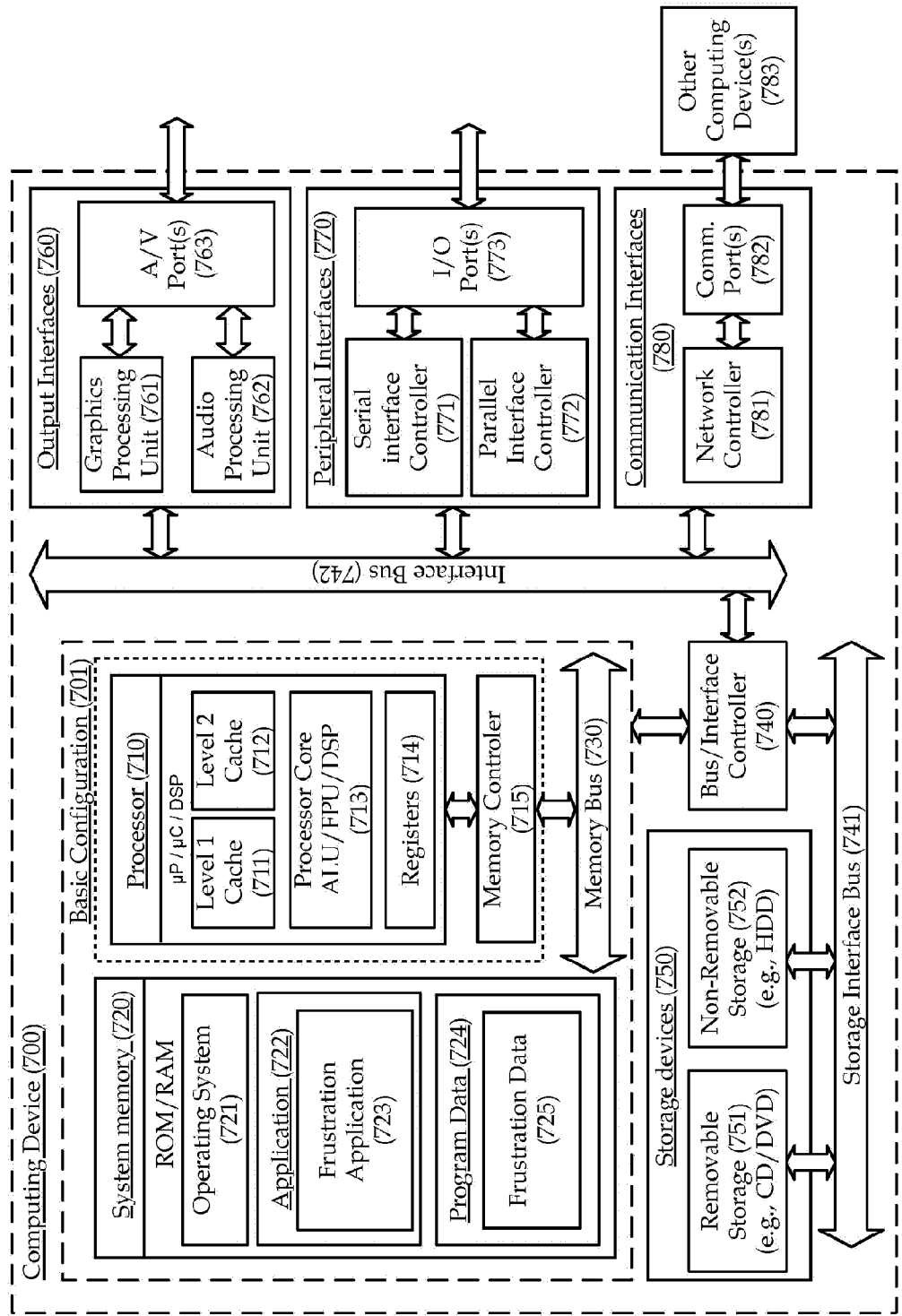
FIG. 7 is a block diagram illustrating an example computing device, all arranged in accordance with at least some embodiments of the present disclosure.

FIG. 7 is a block diagram illustrating an example computing device 700 arranged in accordance with at least some embodiments of the present disclosure. In various examples, computing device 700 may be configured to provide the operations discussed herein. In an example, the devices discussed with respect to FIG. 1 may be provided as a part of computing device 700. In one example basic configuration 701, computing device 700 may include one or more processors 710 and system memory 720. A memory bus 730 can be used for communicating between the processor 710 and the system memory 720.

Depending on the desired configuration, processor 710 may be of any type including but not limited to a microprocessor ($\mu$P), a microcontroller ($\mu$C), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include process unit control application 723 that can be arranged to perform the functions, actions, and/or operations as described herein including the functional blocks, actions, and/or operations described with respect to FIGS. 1 to 5. Program Data 724 may include frustration data 725 for use with the frustration application 723. In some example embodiments, application 722 may be arranged to operate with program data 724 on an operating system 721. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more A/V ports 763. Example peripheral interfaces 770 may include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 770 includes a network controller 781, which may be arranged to facilitate communications with one or more other computing devices 783 over a network communication via one or more communication ports 782. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for providing feedback from a device, the method comprising:
   detecting a user frustration event;
   associating the user frustration event with a device event that includes an active operation of the device at a time when the user frustration event occurred;
   forming an event package based at least in part on the user frustration event and the device event that includes information indicating a level, a type of user frustration, and information related to routing the event package through a network; and
   transmitting the event package.

2. The method of claim 1, wherein the detecting comprises detecting shaking of the device.

3. The method of claim 1, wherein the detecting comprises determining an input parameter is greater than a threshold, wherein the input parameter includes at least one of a button press force, a button press length, a device acceleration, a device velocity, or a microphone volume.

4. The method of claim 1, wherein the detecting comprises determining that an input parameter matches a predetermined pattern using pattern recognition.

5. The method of claim 1, wherein the detecting comprises receiving a frustration signal generated by at least one of a unique frustration keystroke or activation of a frustration button.

6. The method of claim 1, wherein the device event comprises at least one of downloading a webpage, loading a software application, or running a software application.

7. The method of claim 1, further comprising:
   associating the user frustration event with a device position,
   wherein said forming includes providing the device position in the event package.

8. A method for using feedback at a system, the method comprising:
   receiving a frustration event package including a user frustration event indicator and an associated event indicator that indicates a level and a type of user frustration associated with a user frustration event;
   determining feedback based at least in part on the user frustration event indicator and the associated event indicator; and
   providing the feedback.

9. The method of claim 8, further comprising:
   responding to the feedback by increasing a network service in a local area related to a device associated with the frustration event package.

10. The method of claim 8, wherein the feedback comprises a software application performance parameter.

11. The method of claim 8, wherein the feedback comprises a download performance parameter.

12. A method for evaluating services, the method comprising:
provyproviding a first service to a first user group;
receiving a first set of frustration event packages related to the first service;
providing a second service;
receiving a second set of frustration event packages related to the second service; and
evaluating the first set of frustration event packages and the second set of frustration event packages to determine whether the first service or the second service provides a better user experience,
wherein at least one frustration event package of the first set or the second set includes information indicating a level and a type of user frustration associated with a user frustration event related to the first service or the second service.

13. The method of claim 12,
wherein the first service comprises a first web page design, the second service includes a second web page design, and
wherein the first web page design and the second web page design are configured to render substantially the same rendered web page.

14. The method of claim 12, wherein the first service comprises a first software application and the second service includes a second software application.

15. The method of claim 12, wherein the providing the second service comprises providing the second service to the first user group at a different time than the providing the first service to the first user group.

16. The method of claim 12, wherein the providing the second service comprises providing the second service to a second user group contemporaneously with the providing the first service to the first user group.

17. A device for providing user feedback comprising:
a frustration detection module configured to detect a user frustration event and provide a user frustration signal;
a device event determination module configured to determine a device event associated with the user frustration signal; and
a frustration package formation module configured to generate a frustration event package including a user frustration event indicator, a device event indicator, information indicating a level or a type of user frustration associated with the user frustration event, and information related to routing the frustration event package through a network.

18. The device of claim 17, wherein the frustration detection module comprises at least one of an accelerometer, a haptic screen, a button, a camera or a microphone.

19. The device of claim 17, further comprising:
a frustration evaluation module configured to receive the user frustration signal and to determine whether the user frustration signal meets an event reporting threshold.

20. The device of claim 17, further comprising:
a global positioning system module configured to provide a position associated with the user frustration signal.

21. An article comprising:
a computer program product having stored therein instructions that, in response to being executed, result in:
formatting data to detect a user frustration event;
formatting data to associate the user frustration event with a device event;
formatting data to form an event package based at least in part on the user frustration event and the device event, the event package including information indicating a level and a type of user frustration associated with the user frustration event; and
formatting data to transmit the event package.

22. The article of claim 21, the computer program product having stored therein further instructions that, in response to being executed, result in:
formatting data to determine an input parameter related to the user frustration event is greater than a threshold,
wherein the input parameter includes at least one of a button press force, a button press length, a device acceleration, a device velocity, or a microphone volume.

23. The article of claim 22, wherein the device event comprises at least one of downloading a webpage, loading a software application, or running a software application.

24. The article of claim 21, the computer program product having stored therein further instructions that, in response to being executed, result in:
formatting data to store the event package in a memory.

25. An article comprising:
a computer program product having stored therein instructions that, in response to being executed, result in:
formatting data to receive an event package including a user frustration event indicator and an associated event indicator, the user frustration event indicator indicating a level and a type of user frustration associated with a user frustration event;
formatting data to determine feedback based at least in part on the user frustration event indicator and the associated event indicator; and
formatting data to provide the feedback.

26. The article of claim 25, the computer program product having stored therein further instructions that, in response to being executed, result in:
formatting data to respond to the feedback by increasing a network service in a local area related to a device associated with the event package.

27. An article comprising:
a computer program product having stored therein instructions that, in response to being executed, result in:
formatting data to provide a first service to a first user group;
formatting data to receive a first set of frustration event packages related to the first service;
formatting data to provide a second service;
formatting data to receive a second set of frustration event packages related to the second service; and
formatting data to evaluate the first set of frustration event packages and the second set of frustration event packages to determine whether the first service or the second service provides a better user experience,
wherein at least one frustration event package of the first set or the second set includes information indicating a level and a type of user frustration associated with a user frustration event related to the first service or the second service.

28. The article of claim 27,
wherein the first service comprises a first web page design, the second service includes a second web page design, and
wherein the first web page design and the second web page design are configured to render a substantially same rendered web page.

29. The article of claim 27, wherein the first service comprises a first software application and the second service includes a second software application.

* * * * *

UNITED STATES PATENT AND TRADEMARK OFFICE
CERTIFICATE OF CORRECTION

| | | |
|---|---|---|
| PATENT NO. | : 8,680,992 B2 | Page 1 of 1 |
| APPLICATION NO. | : 13/260120 | |
| DATED | : March 25, 2014 | |
| INVENTOR(S) | : Kruglick | |

It is certified that error appears in the above-identified patent and that said Letters Patent is hereby corrected as shown below:

On the Title Page, in Item (87), under "PCT Pub. No.:", in Column 1, Line 1, delete "WO2010/135840" and insert -- WO2012/030349 --, therefor.

On the Title Page, in Item (87), under "PCT Pub. Date:", in Column 1, Line 1, delete "Dec. 2, 2010" and insert -- Mar. 8, 2012 --, therefor.

In the Claims

In Column 14, Line 50, in Claim 7, delete "wherein said" and insert -- wherein the --, therefor.

Signed and Sealed this
Twenty-seventh Day of January, 2015

Michelle K. Lee
*Deputy Director of the United States Patent and Trademark Office*